INVENTORS
J. W. HIGLEY
C. B. STEGNER
BY
Michael P. Breston
ATTORNEY

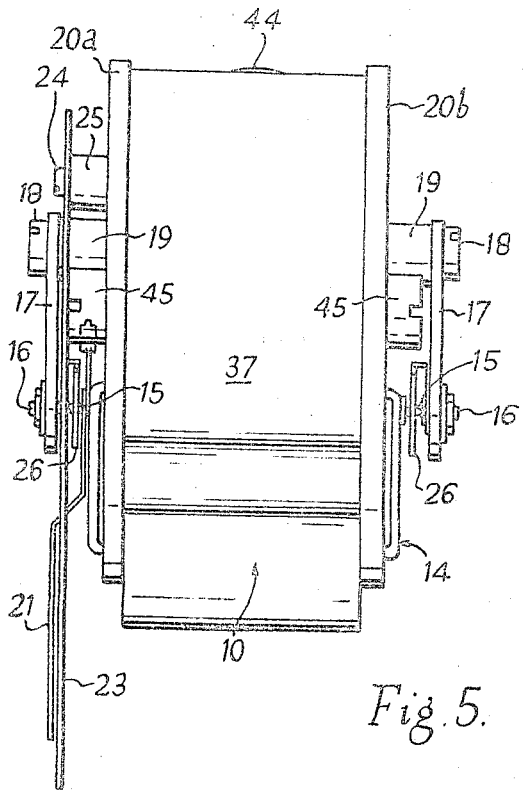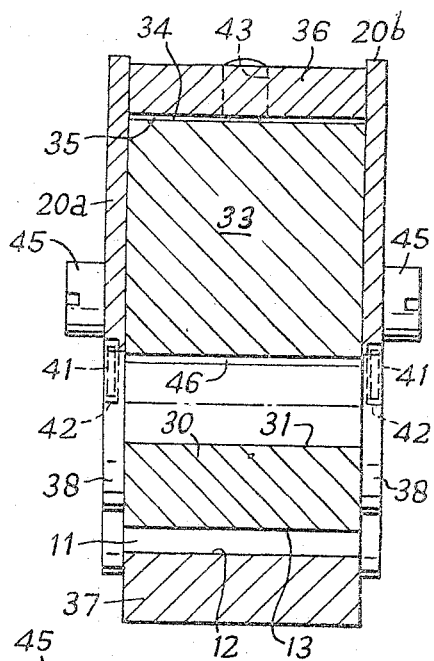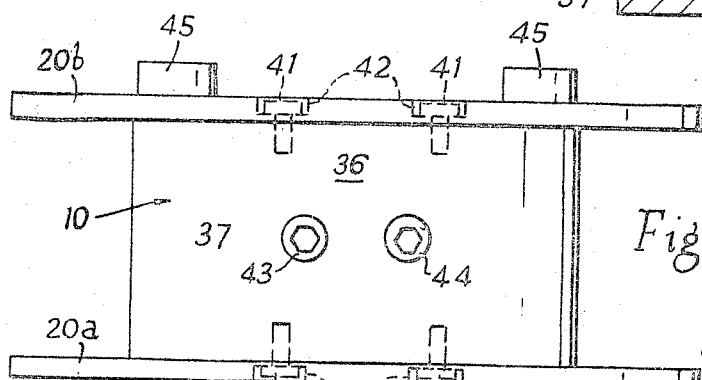

United States Patent Office 3,332,013
Patented July 18, 1967

3,332,013
ELECTRICAL MEASURING INSTRUMENT WITH IMPROVED ADJUSTING ARRANGEMENT
John W. Higley, Iselin, N.J., and Charles B. Stegner, Naugatuck, Conn., assignors to Weston Instruments, Inc., a corporation of Delaware
Filed June 28, 1963, Ser. No. 291,432
14 Claims. (Cl. 324—150)

This invention relates to electrical measuring instruments and is more particularly, although by no means exclusively, concerned with instruments comprising a moving coil arranged for operation in a magnetic flux gap extending around an arc of greater than 180° between an inner pole surface of one polarity and an outer pole surface of opposite polarity to provide what is usually referred to as a "circular scale" type of instrument.

With such instruments in particular, a manufacturing difficulty frequently encountered is that of accurately positioning the inner, usually cylindrical, core within the, again usually cylindrical, outer pole face so as to cause the flux distribution along the gap length to conform to a chosen pattern of relative density values whereby the deflection of the instrument pointer for different values of input current shall conform with the desired degree of accuracy to the markings of an associated scale. The usual pattern of flux density values along the gap length is a constant one whereby a linear scale is provided.

One object of the present invention is to provide an improved form of construction of such "circular scale" type of instrument which facilitates adjustment of the position of the inner pole-forming core after assembly of the instrument components.

Another object of the present invention is to provide an electrical measuring instrument which includes a magnetic flux system defining an arcuate flux gap and a movable coil winding of which a part is movable in said flux gap, said magnetic flux system comprising an outer pole-forming part having a surface thereon defining a substantially part-cylindrical outer pole surface of said flux gap, a core mounting part rigid with said outer pole-forming part, a core member having a surface thereon defining a substantially part-cylindrical inner pole surface of said flux gap, a core locating member rigid with said core member and extending radially therefrom and terminating in close juxtaposition to said core mounting part, means urging said core locating member towards said core mounting part and adjustable abutment means between said core mounting part and the adjacent termination of said core locating member for effecting controlled movement of said core member relative to said outer pole-forming part in a plane normal to the axis of curvature of said inner pole surface of said core member to permit adjustment of the relationship of said inner and outer pole surfaces.

A further object of the invention relates to an electrical measuring instrument comprising a closed ring-shaped magnetic yoke member shaped to define a part-cylindrical surfaced recess therethrough at one side thereof and a planar surface parallel to the axis of said recess at the opposite side thereof, a generally cylindrical magnetic core member located in said recess of said yoke member, said core member having a central axially directed bore therethrough and an axially directed recess in its outer surface, said bore and said recess being in communication with one another by a radial channel, a rectangular block-shaped permanent magnet having one polar end thereof seated in said recess of said core member and its opposite polar end in close proximity to said planar surface of said yoke member, adjustable set screws in said yoke member at the region of said planar surface, said screws being directed towards said magnet block to engage and displace said block relative to said yoke member and a rectangular shaped movable coil winding having one linear side limb thereof located in said central bore of said core member and the opposite linear side limb thereof located in an arcuate gap formed between the outer surface of said core member and the inner surface of said recess in said yoke member.

The nature of the invention will be more readily understood from the following description of one practical embodiment given by way of illustrative example only and with reference to the accompanying drawings.

In the drawings, in which like reference characters indicate like parts:

FIGURE 2 is a side elevational view of the instrument movement of FIG. 1, taken in the direction of the arrow II, FIG. 1.

FIGURE 4 is a plan view of the movement shown in FIG. 3, while

FIGURE 5 is a cross-sectional view taken on the line V—V of FIG. 3.

Figure 1:
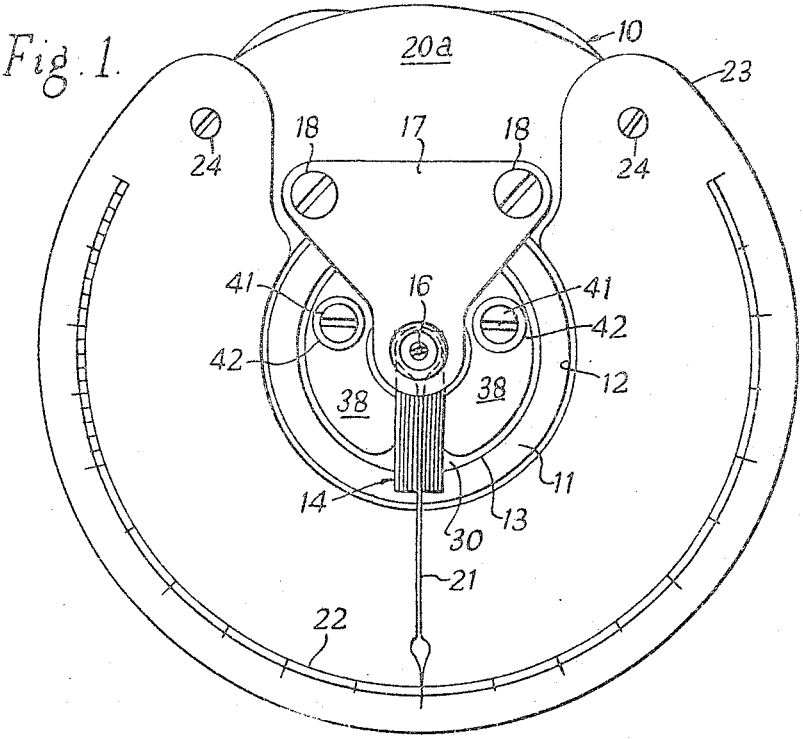
FIGURE 1 is a front elevational view of a moving coil type electrical measuring instrument embodying the invention, the instrument movement being shown removed from its usual protective casing.

Referring first to FIGS. 1 and 2, the instrument comprises a magnetic flux system indicated generally by the reference 10 and including parts as described in detail later defining an arcuate magnetic flux gap 11 extending through an angle of the order of 270° between an outer part-cylindrical pole face 12 and an inner part-cylindrical pole face 13. A moving coil winding of known form and indicated generally at 14 is provided with pivots 15 rotatable in bearing jewels carried by adjustable pivot screws 16 which are threaded into bearer plates 17 secured by screws 18 to support posts 19 projecting from clamping plates 20a, 20b on opposite sides of the flux system 10.

The moving coil winding 14 has a projecting pointer arm 21 secured thereto for movement with respect to an arcuate scale 22 on a fixed scale plate 23 secured by screws 24 to further posts 25 projecting from the front clamping plate 20A. Control springs 26 of conventional form serve to conduct current to the moving coil winding as well as to provide a control torque opposing the torque developed by reason of current in the moving coil winding. The moving coil winding, which is of approximately rectangular shape, has one side limb operating in the arcuate flux gap 11 and its opposite side limb disposed close to the axis of coil rotation and within a central bore of the magnetic flux system where there is no effective magnetic flux. The torque developed by the moving coil system during operation is proportional to the product of the ampere turns due to the current flowing in the moving coil winding and the strength of the magnetic field in which the coil is winding is located at any given instant. If, as in the embodiment being described, a truly linear scale is required it is clearly essential that the magnetic flux density shall be the same at all angular positions around the arcuate flux gap and, as the respective inner and outer pole faces may readily be machined to the required accuracy, the principal problem is that of ensuring the equally accurate positioning of the inner core within the outer pole face whereby the flux density is uniform throughout the length of the flux gap.

Figure 3:
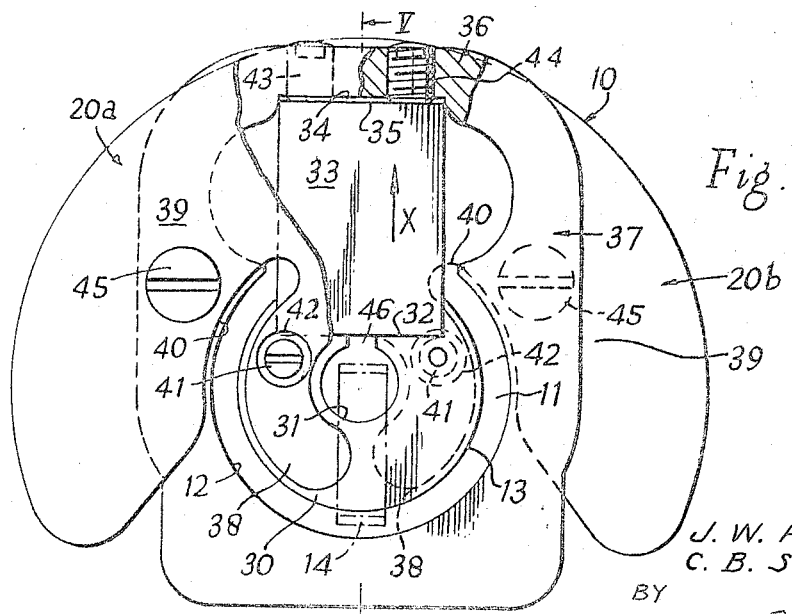
FIGURE 3 is a front elevational view of the magnetic flux path components of the instrument movement shown in FIGS. 1 and 2, with certain parts broken away in order to illustrate the construction more clearly.

Referring now more particularly to FIGS. 3, 4 and 5 of the drawings, the magnetic system 10 of the instrument comprises a central generally cylindrical core 30 of soft iron or other non-retentive magnetic material and having an axial bore 31 and a part-cylindrical outer surface which forms the inner pole face 13 of the annular flux-gap 11. The core 30, which has planar end surfaces normal to its longitudinal axis, is provided with an axially directed rectangular section recess 32 into which is accurately fitted one side surface of a rectangular permanently magnetised block 33. A further radial slot 46 provides communication between such recess 32 and the bore 31. The opposite end of this magnet block 33 has a planar surface 34 facing outwardly and this is located in close juxta-position to a complementary planar surface 35 on an outwardly displaced limb 36 of a solid yoke 37 which is of closed ring form and is made of soft iron, mild steel or other non-retentive magnetic material. This yoke is provided, opposite the surface 35, with a part-cylindrical surfaced recess which constitutes the outer pole surface 12 of the annular flux gap 11. The plane of the surface 35 is parallel with the axis of the recess defining the pole surface 12, both being at right angles to the opposite parallel planar side surfaces of the yoke member.

The yoke 37, magnet block 33 and core 30 are located between the front and rear clamping plates 20a and 20b which are each of non-magnetic material, and, preferably, of similar shape providing a pair of central webs 38 overlying and in contact with the adjacent planar ends of the core 30 and marginal regions 39 overlying and in contact with the yoke 37 with arcuate slots 40 in register with the respective ends of the arcuate flux gap 11. Screws 41 having heads located in recesses 42 in the outwardly facing surfaces of the clamping plates 20a and 20b and passing through enlarged holes in such plates, enter tapped holes at opposite ends of the core 30 for final securing of the latter in a manner to be described later.

The outwardly displaced limb 36 of the yoke 37, in the region having the surface 35, is provided with two set screws 43 and 44 located in tapped holes in the yoke and positioned with their axes lying in a common central plane normal to the axis of the bore 31 which coincides with the pivotal axis of the moving coil winding 14. These set screws are of a type having "cup points" and "Allen" or similar hexagonal section recessed heads and are arranged to bear, by their inner cup point ends, on the opposing surface 34 of the magnet block 33. The clamping plates 20a, 20b are rigidly secured to the opposite faces of the yoke 37 by means of further screws 45.

In the assembly of the instrument, the magnetic flux system components are assembled together with the moving coil 14 and its pivotal mounting arrangements prior to magnetisation of the permanent magnet block 33. After such magnet block has been magnetised by any convenient known method in the direction of arrow $x$, FIG. 3, it becomes very firmly attached by reason of magnetic attraction to the core 30 at one end and to the yoke 37 at the other end. At this stage, the core securing screws 41 have not been tightened whereby the core 30 is free to be moved relatively to the surrounding yoke recess but only in a plane parallel with those of the side surfaces of the yoke member. The adjusting set screws 43 and 44 are, at this time, backed off to be out of contact with the surface 34 of the magnet block.

The deflection of the moving coil pointer arm 21 relative to the associated scale plate markings 22 for different values of input current is then checked and the position of the core 30 altered as required by use of the screws 43 and 44 which operate through the magnet block 33 to shift the core 30 within the outer pole surface 12 thereby to alter the radial dimension of the gap 11 at different positions around the arcuate flux gap. Uniform adjustment of both screws 43, 44 simultaneously will displace the core 30 in a direction which coincides with the centre plane of the magnet block 33 and hence will be effective mainly to alter the radial gap dimension in the vicinity of the mid point of the arcuate flux gap. Non-uniform adjustment of the set screws 43, 44 will cause slight rocking movement of the core 30 to the right or to the left in directions substantially at right angles to the central plane and this will be effective principally to alter the flux gap dimension in the diametral plane which lies at right angles to the above mentioned central plane while maintaining the flux gap dimension at the centre point substantially altered in value. Since magnet block 33 is rigid with core 30 because of the magnetic attraction therebetween, and because any movement of the magnetic block is transmitted to the core, magnetic block 33 may be aptly termed "a core locating member." By appropriate combination of both forms of adjustment movement of the screws 43 and 44, the desired pattern of flux distribution in the gap 11 may readily be obtained to provide conformance of the coil deflection to the scale markings whereafter the core securing screws 41 are tightened to lock the core 30 in position and thereafter prevent any further change.

It will be observed with reference to FIG. 3 that screw 43 engages surface 34 of magnet block 33 at one side of the center plane of the magnetic block and screw 44 engages surface 34 at the other side of the center plane. Hence, set screw 43 will likewise engage surface 34 at one side of a line parallel with the axis of pole face 13 and passing through surface 34, and screw 44 will engage surface 34 at the other side of the line.

Various modifications may clearly be made. For example, only one clamping plate such as 20a may be employed or, if two are employed, these need not be of identical shape. Although the invention has been described with relation to a particular style of magnet system for an extended scale type of instrument having a linear scale, it will be clear that the principles involved may be applied to other forms of moving coil type instruments including those having a non-linear deflection scale without departing from the scope of the invention.

We claim:

1. An electrical measuring instrument which includes a magnetic flux system defining an arcuate flux gap and a movable coil winding of which a part is movable in said flux gap, said magnetic flux system comprising an outer pole-forming part having a surface thereon defining a substantially part-cylindrical outer pole surface of said flux gap, a core mounting part rigid with said outer pole-forming part, and having a surface facing toward said outer pole surface, a core member having a surface thereon defining a substantially part-cylindrical inner pole surface of said flux gap, a core locating member rigid with said core member and extending therefrom and terminating in close juxtaposition to said surface of said core mounting part, first and second adjustable abutment means between said surface of said core mounting part and the adjacent termination of said core locating member for effecting controlled multi-directional movement of said core member relative to said outer pole forming part in a plane normal to the axis of curvature of said inner pole surface of said core member to permit adjustment of the relationship of said inner and outer pole surfaces, and means urging said core locating member towards said first and second abutment means, said core locating member comprising a permanent magnet magnetized to form opposite magnetic poles facing respectively said core member and said termination adjacent said surface of said core mounting part.

2. An electrical measuring instrument according to claim 1 in which the magnetic attraction force set up by said permanent magnet between said surface of said core mounting part and the adjacent termination of said core locating member constitute said means for urging said core locating member towards said core mounting part.

3. An electrical measuring instrument according to claim 2 in which said first and second adjustable abutment means each comprise a set screw extending through said core mounting part into contact with an end termination surface of said core locating member, the two set screws being located with their axes lying in a plane normal to said axis of curvature of said core member.

4. An electrical measuring instrument according to claim 3 in which said outer pole-forming part and said core mounting part are parts of a unitary ring-form yoke member of non-retentive magnetic material.

5. An electrical measuring instrument in accordance with claim 4 in which said core mounting part is on one side of said ring-form yoke in diametral opposition to a part-cylindrical recess whose inner surface defines said outer pole surface, said surface of said core mounting part is flat and continuous, and said set screws extend perpendicularly through said surface.

6. An electrical measuring instrument according to claim 5 in which said core member has an axial bore and in which one linear side limb of said movable coil winding is located therein and an opposite linear side limb of said winding is located in said arcuate flux gap.

7. An electrical measuring instrument according to claim 6 in which said ring-form yoke member has opposite parallel planar surfaces normal to the axis of said part cylindrical recess.

8. An electrical measuring instrument according to claim 7 in which two planar clamping plates are positioned one in contact with each of said parallel planar surfaces, said clamping plates being each rigidly connected to said yoke and including parts extending around said arcuate flux gap and overlying the respective opposite ends of said core member, and which further includes screw clamping means for rigidly securing said core member to said overlying parts of said clamping plate.

9. An electrical measuring instrument comprising a closed ring-shaped magnetic yoke member shaped to define a part-cylindrical surfaced recess therethrough at one side thereof and a planar surface parallel to the axis of said recess at the opposite side thereof, a generally cylindrical magnetic core member located in said recess of said yoke member, said core member having a central axially directed bore therethrough and an axially directed recess in its outer surface, said bore and said recess being in communication with one another by a radial channel, a rectangular block-shaped permanent magnet having one polar end thereof seated in said recess of said core member and its opposite polar end in close proximity to said planar surface of said yoke member, adjustable set screws in said yoke member at the region of said planar surface, said screws being directed towards said magnet block to engage and displace said block relative to said yoke member and a rectangular shaped movable coil winding having one linear side limb thereof located in said central bore of said core member and the opposite linear side limb thereof located in an arcuate gap formed between the outer surface of said core member and the inner surface of said recess in said yoke member.

10. An electrical measuring instrument comprising a closed ring-shaped magnetic yoke member shaped to define a part-cylindrical surfaced recess therethrough at one side thereof and a planar surface parallel to the axis of said recess at the opposite side thereof, a generally cylindrical magnetic core member located in said recess of said yoke member, said core member having a central axially directed bore therethrough and an axially directed recess in its outer surface, said bore and said recess being in communication with one another by a radial channel, a rectangular block-shaped permanent magnet having one polar end thereof seated in said recess of said core member and its opposite polar end in close proximity to said planar surface of said yoke member, two adjustable set screws in said yoke member at the region of said planar surface, said screws being directed towards said magnet block to engage and displace said block relative to said yoke member, said screws being each located in a mid plane of said yoke member lying normal to the axis of said recess therein and a rectangular shaped movable coil winding having one linear side limb thereof located in said central bore of said core member and the opposite linear side limb thereof located in an arcuate gap formed between the outer surface of said core member and the inner surface of said recess in said yoke member.

11. An electrical measuring instrument comprising a closed ring-shaped magnetic yoke member shaped to define a part-cylindrical surfaced recess therethrough at one side thereof and a planar surface parallel to the axis of said recess at the opposite side thereof, said yoke member having opposite parallel planar side surfaces normal to the axis of said recess, a generally cylindrical magnetic core member located in said recess of said yoke member, said core member having planar end surfaces normal to its axis and lying in the respective planes of said side surfaces of said yoke member, said core member having a central axially directed bore therethrough and an axially directed recess in its outer surface, said bore and said recess being in communication with one another by a radial channel, a rectangular block-shaped permanent magnet having one polar end thereof seated in said recess of said core member and its opposite polar end in close proximity to said planar surface of said yoke member, adjustable set screws in said yoke member at the region of said planar surface, said screws being directed towards said magnet block to engage and displace said block relative to said yoke member, first and second clamping plates one on each side of said yoke member in contact with said parallel side surfaces, said clamping plates being rigidly secured to said yoke member and having extension parts thereof overlying the adjacent ends of said core member, securing screws passing through oversized holes in said extension parts into the end surfaces of said core member and a rectangular shaped movable coil winding having one linear side limb thereof located in said central bore of said core member and the opposite linear side limb thereof located in an arcuate gap formed between the outer surface of said core member and the inner surface of said recess in said yoke member.

12. An electrical measuring instrument comprising a closed ring-shaped magnetic yoke member shaped to define a part-cylindrical surfaced recess therethrough at one side thereof and a planar surface parallel to the axis of said recess at the opposite side thereof, said yoke member having opposite parallel planar side surfaces normal to the axis of said recess, a generally cylindrical magnetic core member located in said recess of said yoke member, said core member having planar end surfaces normal to its axis and lying in the respective planes of said side surfaces of said yoke member, said core member having a central axially directed bore therethrough and an axially directed recess in its outer surface, said bore and said recess being in communication with one another by a radial channel, a rectangular block-shaped permanent magnet having one polar end thereof seated in said recess of said core member and its opposite polar end in close proximity to said planar surface of said yoke member, two adjustable set screws in said yoke member at the region of said planar surface, said screws being directed towards said magnet block to engage and displace said block relative to said yoke member, said screws being each located in a mid plane of said yoke member parallel to said opposite planar side surfaces, first and second clamping plates one on each side of said yoke member in contact with said parallel side surfaces, said clamping plates being rigidly secured to said yoke member and having extension parts thereof overlying the adjacent ends of said core member, securing screws passing through oversized holes in said extension parts into the end surfaces of said core member, a rectangular shaped movable coil winding having one linear side limb thereof located in said central bore of said core member and the opposite linear side limb thereof located in an arcuate gap formed between the outer surface of said core member and the inner surface of said recess in said yoke member, pivot bearings for said movable coil secured to said clamping plates for pivotation of said movable coil winding about an axis coincident with the axis of said central bore, a pointer arm connected to said movable coil winding and a fixed scale plate mounted on one of said clamping plates.

13. An electrical measuring instrument comprising a magnetic yoke member shaped to define a part cylindrical surfaced recess therethrough at one side thereof and a planar surface parallel to the axis of said recess at the opposite side thereof, a generally cylindrical magnetic core member located in said recess of said yoke member, said core member having a central axially directed bore therethrough and an axially directed recess in its outer surface, said bore and said recess being in communication with one another by a radial channel, a permanent magnet having one polar end thereof seated in said recess of said core member and its opposite polar end in close proximity to said planar surface of said yoke member, adjustable set screws in said yoke member at the region of said planar surface, said screws being directed towards said magnet to engage and displace said magnet relative to said yoke member, and a movable coil winding having one side limb thereof located in said central bore of said core member and the opposite side limb thereof located in an arcuate gap formed between the outer surface of said core member and the inner surface of said recess in said yoke member.

14. An electrical measuring instrument comprising a generally ring-shaped magnetic yoke shaped to define a part-cylindrical surfaced recess therethrough at one side thereof, a generally cylindrical magnetic core located in said recess of said yoke, a magnetic core locating member rigid with said core and extending through said part-cylindrical surfaced recess toward the other side of said yoke, said yoke being additionally recessed and presenting a face parallel with the axis of and outside the bounds of said part-cylindrical surfaced recess, said core locating member having an end surface thereof adjacent said face, a first set screw extending through said face and engaging said surface at one side of a line at the center of the end surface and parallel with the axis of the core, a second set screw extending through said face and engaging the end surface at the other side of said line, and means to urge said core locating member toward both said set screws, whereby simultaneous rotation of said set screws causes rectilinear movement of said core member and core locating member, and selective adjustment of one only of said set screws causes pivotal movement of said core and core locating member about the location of engagement of the other set screw with the end of the core locating member.

References Cited

UNITED STATES PATENTS

| | | | |
|---|---|---|---|
| 2,221,643 | 11/1940 | Lederer | 324—150 |
| 2,883,624 | 4/1959 | Millar | 324—150 |
| 2,887,656 | 5/1959 | Barry | 324—150 |
| 2,973,480 | 2/1961 | Clark | 324—150 |

WALTER L. CARLSON, *Primary Examiner.*

RUDOLPH V. ROLINEC, *Examiner.*